US011233420B2

(12) United States Patent
Toyoda

(10) Patent No.: US 11,233,420 B2
(45) Date of Patent: Jan. 25, 2022

(54) UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventor: Masaru Toyoda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 29 days.

(21) Appl. No.: 16/647,173

(22) PCT Filed: Oct. 18, 2017

(86) PCT No.: PCT/JP2017/037711
§ 371 (c)(1),
(2) Date: Mar. 13, 2020

(87) PCT Pub. No.: WO2019/077698
PCT Pub. Date: Apr. 25, 2019

(65) Prior Publication Data
US 2021/0257852 A1    Aug. 19, 2021

(51) Int. Cl.
*H02J 9/06* (2006.01)
*H02M 1/00* (2006.01)

(52) U.S. Cl.
CPC .............. *H02J 9/061* (2013.01); *H02J 9/062* (2013.01); *H02M 1/0019* (2021.05)

(58) Field of Classification Search
CPC .................................................. H02J 9/061
See application file for complete search history.

(56) References Cited

U.S. PATENT DOCUMENTS

2011/0049991 A1* 3/2011 Sato ........................ H02M 1/44
307/48
2016/0204691 A1* 7/2016 Okuda .................... H02M 1/32
363/55

FOREIGN PATENT DOCUMENTS

WO    WO 2010/100737 A1    9/2010

OTHER PUBLICATIONS

International Search Report dated Dec. 5, 2017 in PCT/JP2017/037711 filed on Oct. 18, 2017, citing document AA and AO therein, 1 page.

* cited by examiner

*Primary Examiner* — Daniel Kessie
(74) *Attorney, Agent, or Firm* — Oblon, McClelland, Maier & Neustadt, L.L.P.

(57) ABSTRACT

In an uninterruptible power supply apparatus, a bidirectional chopper (5) includes a first IGBT (Q1) for storing DC power generated by a converter (2) into a battery (22) and a second IGBT (Q2) for supplying DC power of the battery to an inverter (8). A control circuit (7) drives the first IGBT at a first frequency (fH) in a sound state of a commercial AC power supply (21) and drives the second IGBT at a second frequency (fL) lower than the first frequency in response to occurrence of a power failure of the commercial AC power supply. Switching loss produced in the second IGBT thus can be reduced.

8 Claims, 9 Drawing Sheets

UNINTERRUPTIBLE POWER SUPPLY APPARATUS

TECHNICAL FIELD

The present invention relates to an uninterruptible power supply apparatus and more particularly to an uninterruptible power supply apparatus including a bidirectional chopper.

BACKGROUND ART

For example, WO2010/100737 (PTL 1) discloses an uninterruptible power supply apparatus including a forward converter converting AC power supplied from a commercial AC power supply to DC power, a reverse converter converting DC power to AC power and supplying the AC power to an AC load, and a bidirectional chopper. The bidirectional chopper includes a first switching element driven at a certain switching frequency for storing DC power generated by the forward converter into a power storage device in a sound state of the commercial AC power supply and a second switching element driven at a certain switching frequency for supplying DC power from the power storage device to the reverse converter in a power failure of the commercial AC power supply.

CITATION LIST

Patent Literature

PTL 1: WO2010/100737

SUMMARY OF INVENTION

Technical Problem

In the conventional uninterruptible power supply apparatus, however, switching loss occurs every time each of the first and second switching elements turns on and off, and the efficiency of the uninterruptible power supply apparatus is reduced.

To solve this problem, the switching frequency may be reduced. However, reducing the switching frequency may increase ripple current flowing in the power storage device and increase the temperature of the power storage device to reduce the lifetime of the power storage device.

A main object of the present invention is therefore to provide an uninterruptible power supply apparatus with high efficiency and with a power storage device having a long life.

Solution to Problem

An uninterruptible power supply apparatus according to the present invention includes a forward converter, a bidirectional chopper, and a control circuit. The forward converter converts AC power supplied from a commercial AC power supply to DC power and supplies the DC power to a DC load. The bidirectional chopper includes a first switching element for storing the DC power generated by the forward converter into a power storage device and a second switching element for supplying DC power of the power storage device to the DC load. The control circuit drives the first switching element at a first frequency in a sound state of the commercial AC power supply, and drives the second switching element at a second frequency lower than the first frequency in response to occurrence of a power failure of the commercial AC power supply.

Advantageous Effects of Invention

In the uninterruptible power supply apparatus according to the present invention, a first switching element for charging is driven at a first frequency in a sound state of a commercial AC power supply, and a second switching element for discharging is driven at a second frequency lower than the first frequency in response to occurrence of a power failure of the commercial AC power supply. Accordingly, switching loss produced in the second switching element can be reduced, and the efficiency can be increased. Since the time for driving the first switching element is shorter than the time for driving the second switching element, the reduction in lifetime of the power storage device can be suppressed.

DESCRIPTION OF EMBODIMENTS

First Embodiment

Figure 1:
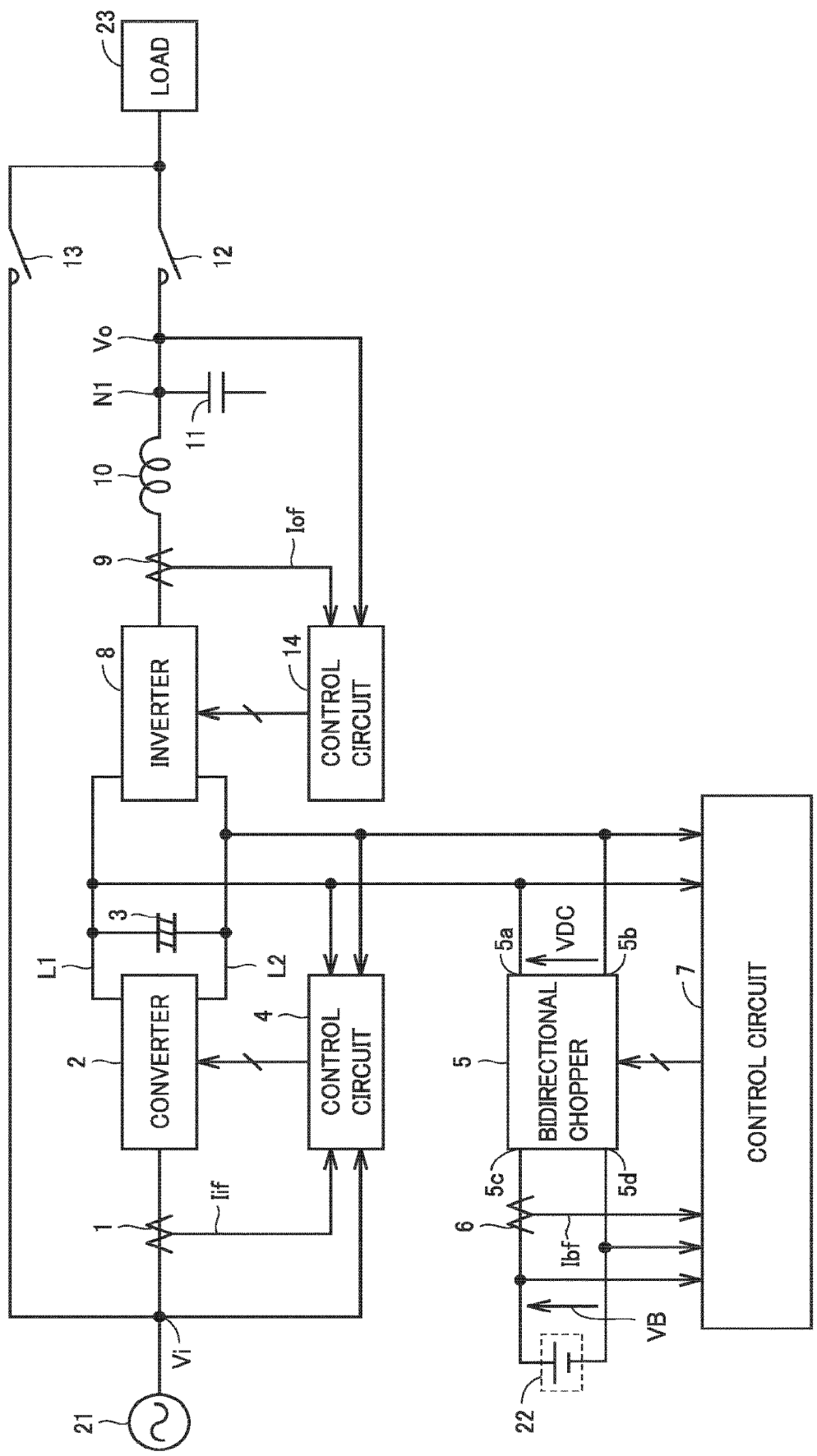
FIG. 1 is a circuit block diagram showing a configuration of an uninterruptible power supply apparatus according to a first embodiment of the present invention.

FIG. 1 is a circuit block diagram showing a configuration of an uninterruptible power supply apparatus according to a first embodiment of the present invention. In FIG. 1, the uninterruptible power supply apparatus includes current detectors 1, 6, and 9, a converter 2, DC lines L1 and L2, capacitors 3 and 11, control circuits 4, 7, and 14, a bidirectional chopper 5, an inverter 8, a reactor 10, and electromagnetic contacts 12 and 13.

This uninterruptible power supply apparatus is driven by AC power having a commercial frequency supplied from a commercial AC power supply 21. The instantaneous value of AC input voltage Vi supplied from commercial AC power supply 21 is detected by control circuit 4. Current detector 1 detects AC input current Ii flowing from commercial AC power supply 21 to converter 2 and applies signal Iif indicating the detected value to control circuit 4.

Converter 2 (forward converter) is controlled by control circuit 4 and converts AC power to DC power to output the DC power to DC lines L1 and L2 when AC power is supplied normally from commercial AC power supply 21 (in a sound state of the commercial AC power supply). When supply of AC power from commercial AC power supply 21 is stopped (in a power failure of commercial AC power supply 21), the operation of converter 2 is stopped. DC voltage VDC output from converter 2 is controllable to a desired value.

Capacitor 3 is connected between DC lines L1 and L2 to smooth the voltage between DC lines L1 and L2. The instantaneous value of DC voltage VDC between DC lines L1 and L2 is detected by control circuit 4.

Control circuit 4 detects whether a power failure of commercial AC power supply 21 has occurred, based on the detected value of AC input voltage Vi. In a sound state of commercial AC power supply 21, control circuit 4 controls converter 2 such that DC voltage VDC attains a predetermined reference DC voltage VDCr (for example, 660 V), based on AC input voltage Vi, AC input current Ii, and DC voltage VDC. In a power failure of commercial AC power supply 21, control circuit 4 stops the operation of converter 2.

DC lines L1 and L2 are connected to inverter 8 and connected to high voltage-side nodes 5a and 5b of bidirectional chopper 5, respectively. Low voltage-side nodes 5c and 5d of bidirectional chopper 5 are connected to the positive electrode and the negative electrode of battery 22, respectively. Battery 22 (power storage device) stores DC power. Instead of battery 22, a capacitor may be provided.

Bidirectional chopper 5 is controlled by control circuit 7 and stores DC power generated by converter 2 into battery 22 in a sound state of commercial AC power supply 21 and supplies DC power of battery 22 to inverter 8 through DC lines L1 and L2 in response to occurrence of a power failure of commercial AC power supply 21.

The instantaneous value of DC voltage VDC between DC lines L1 and L2 is detected by control circuit 7. Current detector 6 detects DC current Ib flowing between low voltage-side node 5c of bidirectional chopper 5 and the positive electrode of battery 22 and applies signal Ibf indicating the detected value to control circuit 7. The instantaneous value of terminal-to-terminal voltage VB of battery 22 is detected by control circuit 7.

Control circuit 7 controls bidirectional chopper 5 based on DC voltage VDC, DC current Ib, and terminal-to-terminal voltage VB of battery 22. Control circuit 7 determines whether a power failure of commercial AC power supply 21 has occurred, based on the polarity of DC current Ib. This determination method will be described later.

Control circuit 7 controls bidirectional chopper 5 such that DC power generated by converter 2 is stored into battery 22 and terminal-to-terminal voltage VB of battery 22 attains a predetermined reference DC voltage VBr (for example, 480 V), in a sound state of commercial AC power supply 21.

Control circuit 7 also controls bidirectional chopper 5 such that DC power of battery 22 is supplied to inverter 8 and DC voltage VDC between DC lines L1 and L2 attains a predetermined reference DC voltage VDCr (for example, 660 V), in response to occurrence of a power failure of commercial AC power supply 21.

Inverter 8 is controlled by control circuit 14 and converts DC power supplied from converter 2 and bidirectional chopper 5 through DC lines L1 and L2 to AC power having a commercial frequency to output the converted AC power. That is, inverter 8 converts DC power supplied from converter 2 through DC lines L1 and L2 to AC power in a sound state of commercial AC power supply 21 and converts DC power supplied from battery 22 through bidirectional chopper 5 to AC power in response to occurrence of a power failure of commercial AC power supply 21. AC output voltage from inverter 8 is controllable to a desired value.

The output node of inverter 8 is connected to one terminal of reactor 10, and the other terminal (node N1) of reactor 10 is connected to a load (AC load) 23 through electromagnetic contact 12. Capacitor 11 is connected to node N1.

Reactor 10 and capacitor 11 constitute a low pass filter to allow AC power having a commercial frequency generated by inverter 8 to pass through load 23 and to prevent a signal having a switching frequency generated in inverter 8 from passing through load 23. Inverter 8, reactor 10, and capacitor 11 constitute a reverse converter. The reverse converter and load 23 constitute a DC load.

Current detector 9 detects the instantaneous value of output current (AC output current) Io from inverter 8 and applies signal Iof indicating the detected value to control circuit 14. The instantaneous value of AC output voltage Vo appearing at node N1 is detected by control circuit 14. Control circuit 14 controls inverter 8 such that AC output voltage Vo attains a predetermined reference AC voltage Vor based on AC output voltage Vo and AC output current Io.

Electromagnetic contact 12 is turned on in an inverter power feed mode in which AC power generated by inverter 8 is supplied to load 23, and is turned off in a bypass power feed mode in which AC power from commercial AC power supply 21 is supplied to load 23.

Electromagnetic contact 13 is connected between commercial AC power supply 21 and load 23, turned off in the inverter power feed mode, and turned on in the bypass power feed mode. When inverter 8 is failed in the inverter power feed mode, electromagnetic contact 13 is turned on and electromagnetic contact 12 is turned off, and AC power from commercial AC power supply 21 is supplied to load 23.

Figure 2:
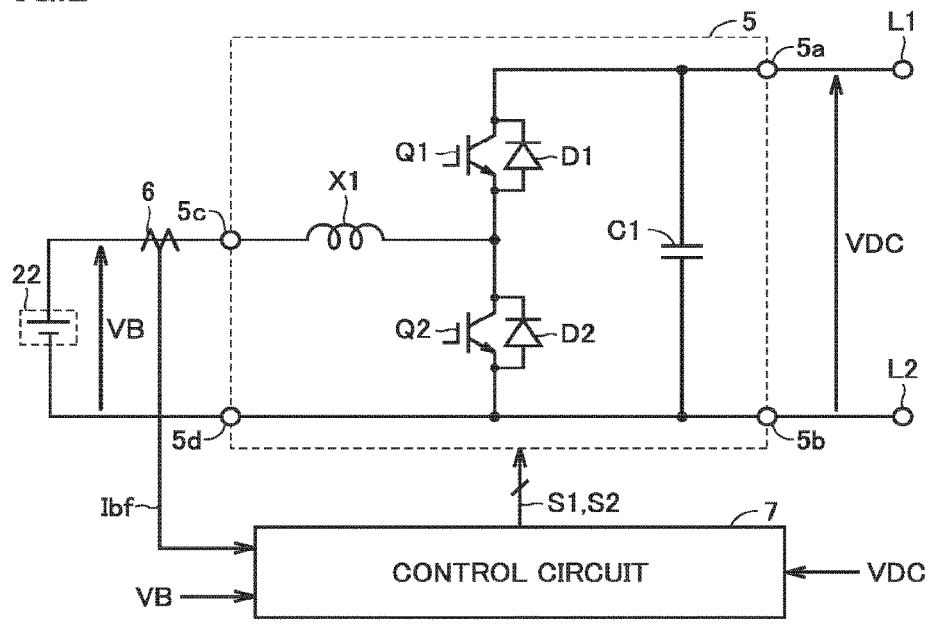
FIG. 2 is a circuit diagram showing a configuration of a bidirectional chopper shown in FIG. 1.

FIG. 2 is a circuit diagram showing a configuration of bidirectional chopper 5. In FIG. 2, bidirectional chopper 5 includes IGBTs (Insulated Gate Bipolar Transistors) Q1 and Q2, diodes D1 and D2, a reactor X1, and a capacitor C1.

IGBT Q1 has the collector connected to high voltage-side node 5a and the emitter connected to low voltage-side node 5c through reactor X1 and connected to the collector of IGBT Q2. The emitter of IGBT Q2 is connected to high voltage-side node 5b and low voltage-side node 5d. Diodes D1 and D2 are connected in anti-parallel with IGBTs Q1 and Q2, respectively. Capacitor C1 is connected between high voltage-side nodes 5a and 5b to stabilize DC voltage VDC between high voltage-side nodes 5a and 5b.

IGBT Q1 (first switching element) is turned on and off at relatively high frequency fH in a sound state of commercial AC power supply 21 and stores DC power generated by converter 2 into battery 22. In a sound state of commercial AC power supply 21, IGBT Q2 is fixed to the off state.

IGBT Q1 is controlled by gate signal S1 (first control signal) from control circuit 7. Gate signal S1 is set to "H" level and "L" level at constant frequency fa IGBT Q1 turns on when gate signal S1 is set to "H" level, and IGBT Q1 turns off when gate signal S1 is set to "L" level.

In a sound state of commercial AC power supply 21, when IGBT Q1 is turned on, if VDC>VB, current Ib flows through a path from DC line L1 to DC line L2 through IGBT Q1, reactor X1, and battery 22, so that battery 22 is charged and electromagnetic energy is stored in reactor X1.

When IGBT Q1 is turned off, current flows through a path from one terminal (the terminal on the battery 22 side) of reactor X1 to the other terminal of reactor X1 through battery 22 and diode D2, so that battery 22 is charged and electromagnetic energy of reactor X1 is emitted.

The ratio between a period of time in which gate signal S1 is set to "H" level (pulse width) and one period (1/fH) is called duty ratio. Terminal-to-terminal voltage VB of battery 22 can be adjusted to a predetermined reference DC voltage VBr by adjusting the duty ratio of gate signal S1. DC voltage VDC between DC lines L1 and L2 is lowered and applied to battery 22, and VB<VDC is attained.

IGBT Q2 (second switching element) is turned on and off at relatively low constant frequency fL in response to occurrence of a power failure of commercial AC power supply 21 and supplies DC power of battery 22 to inverter 8, where fL<fH.

IGBT Q2 is controlled by gate signal S2 (first control signal) from control circuit 7. Gate signal S2 is set to "H" level and "L" level at constant frequency fL. IGBT Q2 turns on when gate signal S2 is set to "H" level, and IGBT Q2 turns off when gate signal S2 is set to "L" level.

When supply of AC power from commercial AC power supply 21 is stopped and DC voltage VDC between DC lines L1 and L2 becomes lower than terminal-to-terminal voltage VB of battery 22, IGBT Q1 is fixed to the off state, and the turning on and off of IGBT Q2 is started.

When IGBT Q2 is turned on, current flows from the positive electrode of battery 22 to the negative electrode of battery 22 through reactor X1 and IGBT Q2, and electromagnetic energy is stored in reactor X1. When IGBT Q2 is turned off, current flowing from reactor X1 to IGBT Q2 is commutated from reactor X1 to diode D1 and flows to the negative electrode of battery 22 through capacitor C1, so that battery 22 is charged and electromagnetic energy of reactor X1 is emitted.

The ratio between a period of time in which gate signal S2 is set to "H" level (pulse width) and one period (1/fH) is called duty ratio. DC voltage VDC between DC lines L1 and L2 can be adjusted to a predetermined reference DC voltage VDCr by adjusting the duty ratio of gate signal S2. Terminal-to-terminal voltage VB of battery 22 is raised and applied between DC lines L1 and L2, and VB<VDC is attained.

Control circuit 7 detects whether a power failure of commercial AC power supply 21 has occurred, based on output signal Ibf from current detector 6. When a power failure of commercial AC power supply 21 occurs, the operation of converter 2 is stopped, and DC power is supplied from capacitors 3 and C1 to inverter 8, and DC voltage VDC between DC lines L1 and L2 lowers. When VDC=VB, current does not flow through IGBT Q1 even by turning on and off IGBT Q1. When VDC<VB, current Ib flows from the positive electrode of battery 22 to the negative electrode of battery 22 through reactor X1, diode D1, and capacitor C1.

Thus, when a power failure of commercial AC power supply 21 occurs, the polarity of current Ib flowing from low voltage-side node 5c of bidirectional chopper 5 to the positive electrode of battery 22 is reversed from positive to negative. When the polarity of current Ib is reversed from positive to negative, control circuit 7 determines that a power failure of commercial AC power supply 21 has occurred. Current detector 6 may be provided inside bidirectional chopper 5. For example, current detector 6 may detect current Ib flowing between the emitter of IGBT Q1 and reactor X1.

When commercial AC power supply 21 is in a sound state and the operation of the uninterruptible power supply apparatus is started, control circuit 7 sets gate signal S1 to "H" level and "L" level at relatively high constant frequency fH and fixes gate signal S2 to "L" level. Since frequency fH is set to a relatively high frequency, ripple current flowing through battery 22 is suppressed. Accordingly, the temperature rise of battery 22 due to ripple current is suppressed, and the reduction in lifetime of battery 22 due to ripple current can be prevented.

When occurrence of a power failure of commercial AC power supply 21 is detected, control circuit 7 sets gate signal S2 to "H" level and "L" level at relatively low constant frequency fL and fixes gate signal S1 to "L" level. Since frequency fL is set to a relatively low frequency, switching loss in IGBT Q2 can be suppressed. Thus, the efficiency of the uninterruptible power supply apparatus is increased, and the operating time of load 23 during a power failure can be increased.

In this case, ripple current flows through battery 22 to increase the temperature of battery 22. However, the time for driving IGBT Q2 is shorter than the time for driving IGBT Q1 and therefore the reduction in lifetime of battery 22 can be suppressed.

Figure 3:
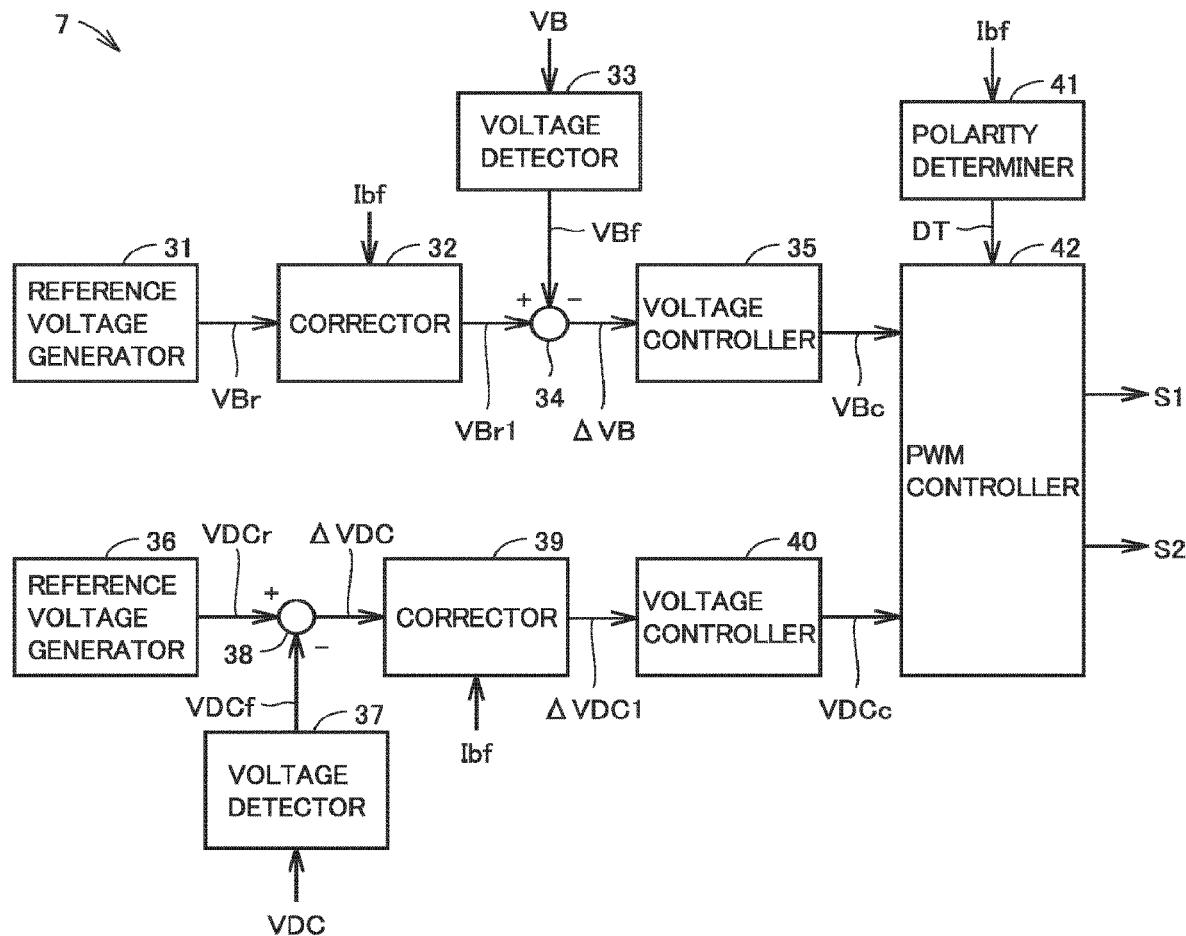
FIG. 3 is a block diagram showing a configuration of a control circuit 7 shown in FIG. 2.

FIG. 3 is a block diagram showing a configuration of control circuit 7. In FIG. 3, control circuit 7 includes reference voltage generators 31 and 36, correctors 32 and 39, voltage detectors 33 and 37, subtractors 34 and 38, voltage controllers 35 and 40, a polarity determiner 41, and a PWM (Pulse Width Modulation) controller 42.

Reference voltage generator 31 generates reference DC voltage VBr (first reference DC voltage) that is a target voltage of terminal-to-terminal voltage VB of battery 22. Corrector 32 operates based on output signal Ibf of current detector 6 (FIG. 2) and corrects reference DC voltage VBr in accordance with current Ib flowing into battery 22 to output reference voltage corrected value VBr1. Corrector 32 adjusts reference voltage corrected value VBr1 while monitoring the magnitude of current Ib, for example, in order to prevent flow of excessive current Ib at initial charging of battery 22.

Voltage detector 33 detects terminal-to-terminal voltage VB of battery 22 and outputs signal VBf indicating the detected value. Subtractor 34 obtains a deviation ΔVB between reference voltage corrected value VBr1 and output signal VBf of voltage detector 33. Voltage controller 35 adds a value proportional to deviation ΔVB to an integral value of deviation ΔVB to generate voltage command value VBc.

Corrector 32, subtractor 34, and voltage controller 35 constitute a first voltage command unit that generates voltage command value VBc (first voltage command value) such that terminal-to-terminal voltage VB of battery 22 attains reference DC voltage VBr.

Reference voltage generator 36 generates reference DC voltage VDCr (second reference DC voltage) that is a target voltage of DC voltage VDC between DC lines L1 and L2. Voltage detector 37 detects DC voltage VDC between DC lines L1 and L2 and outputs signal VDCf indicating the detected value. Subtractor 38 obtains deviation ΔVDC between reference DC voltage VDCr and output signal VDCf of voltage detector 37.

Corrector 39 operates based on output signal Ibf of current detector 6 (FIG. 2) and corrects deviation ΔVDC in accordance with the magnitude of current Ib flowing out from battery 22 to output deviation corrected value ΔVDC1. Corrector 39 adjusts deviation corrected value ΔVDC1 while monitoring the magnitude of current Ib, for example, in order to prevent flow of excessive current Ib at initial discharging of battery 22. Voltage controller 40 adds a value proportional to deviation corrected value ΔVDC1 to an integral value of deviation corrected value ΔVDC1 to generate voltage command value VDCc.

Subtractor 38, corrector 39, and voltage controller 40 constitute a second voltage command unit that generates voltage command value VDCc (second voltage command value) such that DC voltage VDC between DC lines L1 and L2 attains reference DC voltage VDCr.

Polarity determiner 41 determines the polarity of DC current Ib flowing between low voltage-side node 5c of bidirectional chopper 5 and the positive electrode of battery 22, based on output signal Ibf of current detector 6 (FIG. 2) and outputs signal DT indicating the determination result.

When DC current Ib flows from low voltage-side node 5c of bidirectional chopper 5 to the positive electrode of battery 22, it is determined that DC current Ib has the positive polarity, and signal DT is set to "H" level. Conversely, when DC current Ib flows from the positive electrode of battery 22 to low voltage-side node 5c of bidirectional chopper 5, it is determined that DC current Ib has the negative polarity, and signal DT is set to "L" level.

When output signal DT of polarity determiner 41 is "H" level, PWM controller 42 generates gate signal S1 based on the result of comparison between voltage command value VBc from voltage controller 35 and triangular wave signal CW having relatively high frequency fH and fixes gate signal S2 to "L" level.

When output signal DT of polarity determiner 41 is "L" level, PWM controller 42 generates gate signal S2 based on the result of comparison between voltage command value VDCc from voltage controller 40 and triangular wave signal CW having relatively low frequency fL and fixes gate signal S2 to "L" level.

Figure 4:
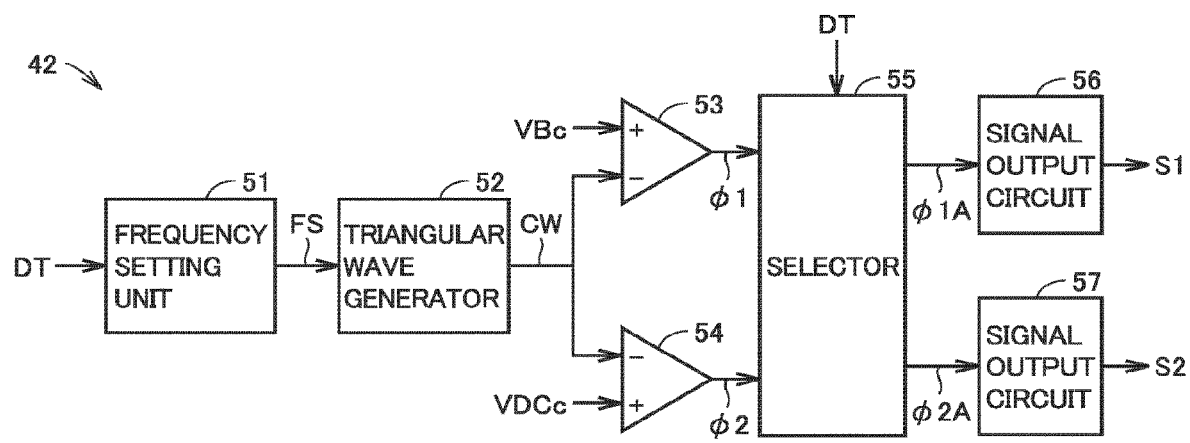
FIG. 4 is a block diagram showing a configuration of a PWM controller shown in FIG. 3.

FIG. 4 is a block diagram showing a configuration of PWM controller 42. In FIG. 4, PWM controller 42 includes a frequency setting unit 51, a triangular wave generator 52, comparators 53 and 54, a selector 55, and signal output circuits 56 and 57.

Frequency setting unit 51 outputs signal FS having information indicating the frequency of triangular wave signal CW, in response to output signal DT of polarity determiner 41 (FIG. 3). When signal DT is "H" level, signal FS has information indicating relatively high frequency fH. When signal DT is "L" level, signal FS has information indicating relatively low frequency fL.

Triangular wave generator 52 generates triangular wave signal CW having a frequency indicated by signal FS. Hence, when signal DT is "H" level, triangular wave signal CW having relatively high frequency fH is generated, and when signal DT is "L" level, triangular wave signal CW having relatively low frequency fL is generated.

Comparator 53 compares the levels of voltage command value VBc from voltage controller 35 (FIG. 3) and triangular wave signal CW and outputs PWM signal 91 indicating the comparison result. When VBc>CW, PWM signal φ1 is set to "H" level, and when VBc<CW, PWM signal φ1 is set to "L" level.

Comparator 54 compares the levels of voltage command value VDCc from voltage controller 40 (FIG. 3) and triangular wave signal CW and outputs PWM signal 92 indicating the comparison result. When VDCc>CW, PWM signal φ2 is set to "H" level, and when VDCc<CW, PWM signal φ2 is set to "L" level.

When output signal DT of polarity determiner 41 (FIG. 3) is "H" level, selector 55 selects PWM signal φ1 from PWM signals φ1 and φ2, applies the selected PWM signal φ1 as PWM signal φ1A to signal output circuit 56, and applies PWM signal φ2A fixed to "L" level to signal output circuit 57.

When output signal DT of polarity determiner 41 (FIG. 3) is "L" level, selector 55 selects PWM signal φ2 from PWM signals φ1 and φ2, applies the selected PWM signal φ2 as PWM signal φ2A to signal output circuit 57, and applies PWM signal φ1A fixed to "L" level to signal output circuit 56.

Signal output circuit 56 performs amplification and level conversion processing on PWM signal φ1A from selector 55 and generates gate signal S1 having the same waveform as PWM signal φ1A to apply the generated signal to the gate of IGBT Q1 in bidirectional chopper 5. Signal output circuit 57 performs amplification and level conversion processing on PWM signal φ2A from selector 55 and generates gate signal S2 having the same waveform as PWM signal φ2A to apply the generated signal to the gate of IGBT Q2 in bidirectional chopper 5.

Figure 5:
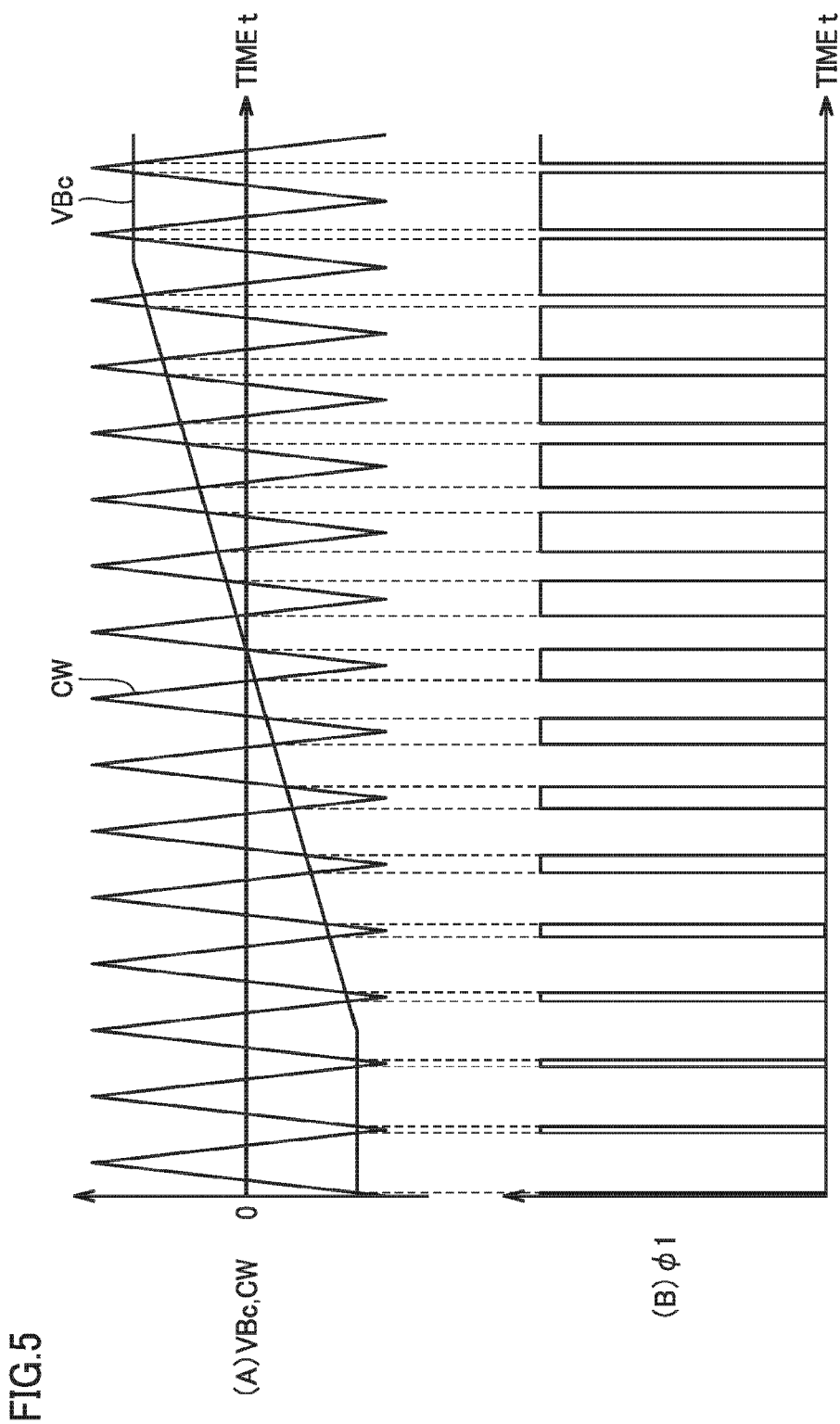
FIG. 5 is a time chart showing the waveforms of voltage command value VBc, triangular wave signal CW, and PWM signal φ 1 shown in FIG. 4.

FIGS. 5(A) and 5(B) are time charts showing the waveforms of voltage command value VBc, triangular wave signal CW, and PWM signal φ1 shown in FIG. 4. As shown in FIG. 5(A), triangular wave signal CW changes at constant frequency fH or fL between the negative-side peak value and the positive-side peak value. Voltage command value VBc changes between the negative-side peak value and the positive-side peak value. In FIG. 5(A), voltage command value VBc changes linearly from a negative value to a positive value.

As shown in FIGS. 5(A) and 5(B), when voltage command value VBc is greater than triangular wave signal CW, PWM signal φ1 goes to "H" level, and when voltage command value VBc is smaller than triangular wave signal CW, PWM signal φ1 goes to "L" level. Thus, as voltage command value VBc increases, the duty ratio of PWM signal φ1 increases.

The waveforms of voltage command value VDCc, triangular wave signal CW, and PWM signal φ2 are similar to the waveforms of voltage command value VBc, triangular wave signal CW, and PWM signal φ1, and a description thereof will not be repeated.

The operation of the uninterruptible power supply apparatus shown in FIG. 1 to FIG. 5 will now be described. It is assumed that the inverter power feed mode is selected, electromagnetic contact 12 is turned on, and electromagnetic contact 13 is turned off. In a sound state of commercial AC power supply 21, AC power supplied from commercial AC power supply 21 is converted by converter 2 to DC power, the DC power is converted by inverter 8 to AC power, which is in turn supplied to load 23, and load 23 is operated.

Part of DC power generated by converter 2 is stored into battery 22 by bidirectional chopper 5. At this time, in control circuit 7 (FIG. 3), voltage command value VBc is generated such that terminal-to-terminal voltage VB of battery 22 attains reference DC voltage VBr, and signal DT is set to "H" level by polarity determiner 41.

In PWM controller 42 (FIG. 4), triangular wave signal CW having relatively high frequency fH is generated in response to signal DT at "H" level, PWM signal φ1 indicating the result of comparison between the generated triangular wave signal CW and voltage command value VBc is generated, and gate signal S1 having the same waveform as the generated PWM signal φ1 is generated. With this gate signal S1, IGBT Q1 (FIG. 2) of bidirectional chopper 5 is turned on and off, and DC voltage VDC between DC lines L1 and L2 is lowered to be supplied to battery 22.

When a power failure of commercial AC power supply 21 occurs, the operation of converter 2 is stopped, and DC power of battery 22 is supplied by bidirectional chopper 5 to inverter 8 and converted to AC power, which is in turn supplied to load 23.

That is, when the operation of converter 2 is stopped and DC voltage VDC between DC lines L1 and L2 lowers, current Ib flows from the positive electrode of battery 22 to the low voltage-side node 5c of bidirectional chopper 5 (FIG. 2), the polarity of current Ib is reversed from positive to negative, and output signal DT of polarity determiner 41 (FIG. 3) is set to "L" level. In control circuit 7 (FIG. 3), voltage command value VDCc is generated such that DC voltage VDC between DC lines L1 and L2 attains reference DC voltage VDCr.

In PWM controller 42 (FIG. 4), triangular wave signal CW having relatively low frequency fL is generated in response to signal DT at "L" level, PWM signal φ2 indicating the result of comparison between the generated triangular wave signal CW and voltage command value VDCc is generated, and gate signal S2 having the same waveform as the generated PWM signal φ2 is generated. With this gate signal S2, IGBT Q2 of bidirectional chopper 5 (FIG. 2) is turned on and off, and terminal-to-terminal voltage VB of battery 22 is raised to be supplied to inverter 8 through DC lines L1 and L2.

As described above, in the present first embodiment, IGBT Q1 for charging is driven at relatively high frequency fH in a sound state of commercial AC power supply 21, and IGBT Q2 for discharging is driven at relatively low frequency fL in response to occurrence of a power failure of commercial AC power supply 21. Thus, switching loss produced in IGBT Q2 can be reduced compared with when IGBT Q2 is driven at the same high frequency fH as IGBT Q1, and the efficiency of the uninterruptible power supply apparatus during a power failure can be increased. The operating time of the load 23 during a power failure therefore can be increased. Since the time for driving IGBT Q2 is sufficiently shorter than the time for driving IGBT Q1, the reduction in lifetime of battery 22 can be suppressed.

Second Embodiment

Figure 6:
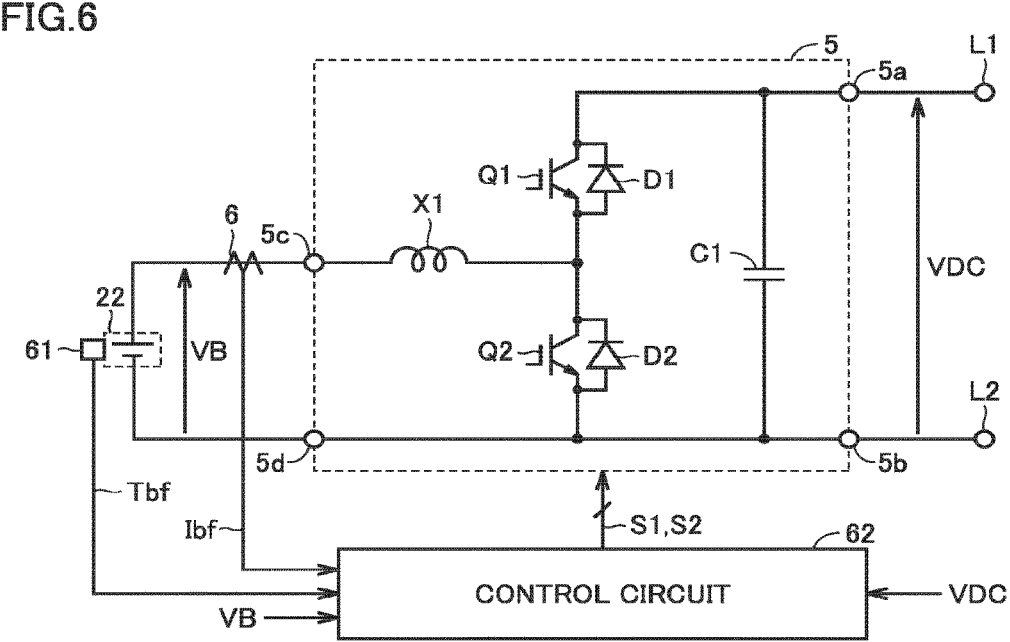
FIG. 6 is a circuit block diagram showing the main part of an uninterruptible power supply apparatus according to a second embodiment of the present invention.

FIG. 6 is a circuit block diagram showing the main part of an uninterruptible power supply apparatus according to a second embodiment of the present invention, in comparison with FIG. 2. Referring to FIG. 6, this uninterruptible power supply apparatus differs from the uninterruptible power supply apparatus in the first embodiment in that a temperature detector 61 is added and control circuit 7 is replaced by a control circuit 62. Temperature detector 61 detects temperature Tb of battery 22 and applies signal Tbf indicating the detected value to control circuit 62.

Control circuit 62 differs from control circuit 7 in that frequency f for driving IGBT Q2 of bidirectional chopper 5 (FIG. 6) when a power failure of commercial AC power supply 21 occurs is reduced from relatively low frequency fL to lower limit frequency fmin1 at which temperature Tb of battery 22 reaches upper limit value TbH1.

That is, when frequency f for driving IGBT Q2 is reduced, switching loss in IGBT Q2 is reduced, and the efficiency of the uninterruptible power supply apparatus is increased. However, when the frequency f is reduced, ripple current increases, temperature Tb of battery 22 rises, and the lifetime of battery 22 is reduced.

When the lifetime of battery 22 in a case where battery 22 is used at reference temperature Tbs (for example 25° C.) is 100(%), the lifetime ratio (%) of battery 22 in a case where battery 22 is used at temperature Tb equal to or higher than reference temperature Tbs is reduced in accordance with the difference (Tb−Tbs) between battery temperature Tb and reference temperature Tbs. In the present second embodiment, frequency f for driving IGBT Q2 is reduced until battery temperature Tb reaches upper limit value TbH1 within a range in which the lifetime ratio (%) of battery 22 falls within a permissible range.

Figure 7:
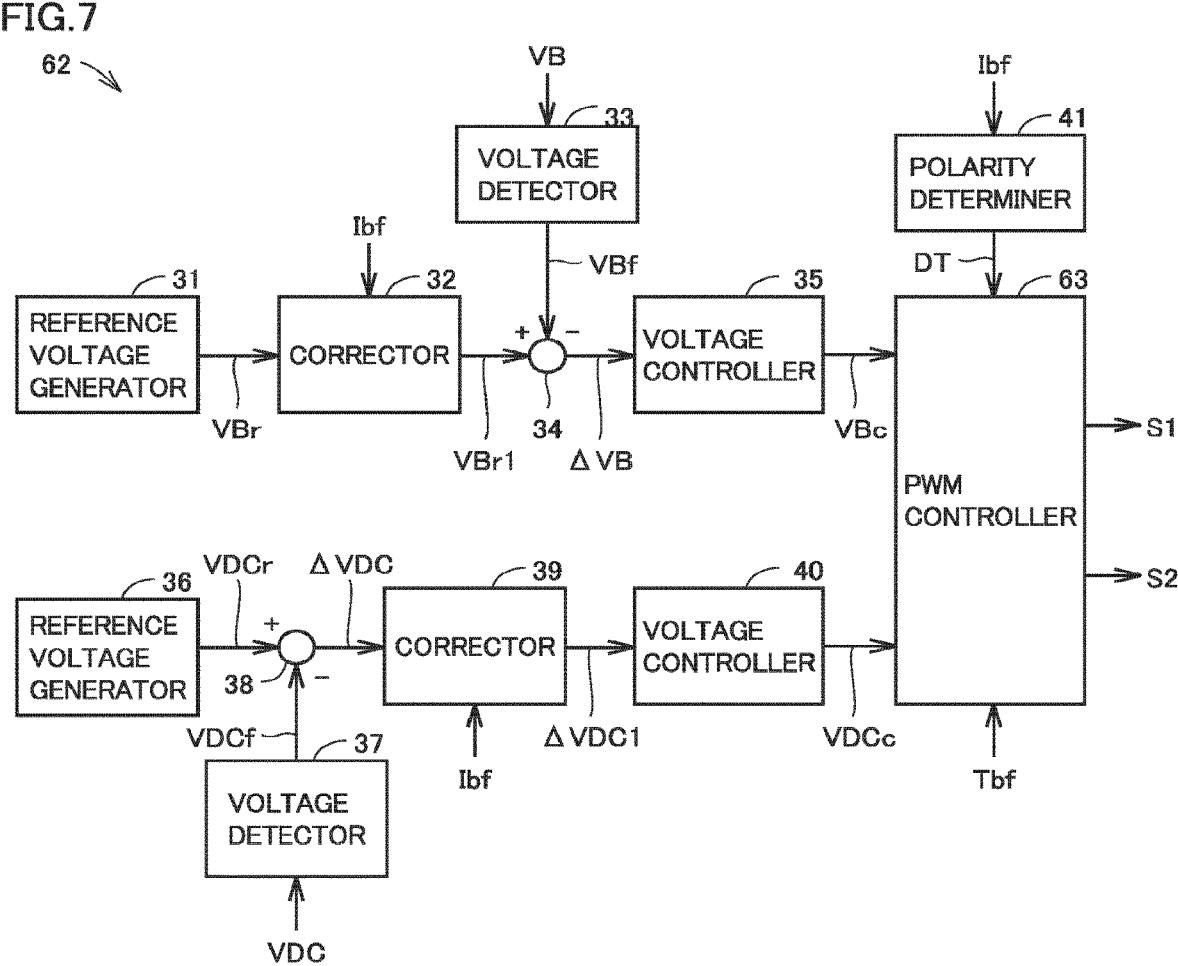
FIG. 7 is a block diagram showing a configuration of a control circuit shown in FIG. 6.

FIG. 7 is a block diagram showing a configuration of control circuit 62, in comparison with FIG. 3. Referring to FIG. 7, control circuit 62 differs from control circuit 7 in that PWM controller 42 is replaced by a PWM controller 63.

PWM controller 63 differs from PWM controller 42 in that it operates based on output signal Tbf of temperature detector 61, and when a power failure of commercial AC power supply 21 occurs, frequency f of triangular wave signal CW to be compared with voltage command value VDCc is reduced from predetermined frequency fL to lower limit frequency fmin1 at which temperature Tb of battery 22 reaches upper limit value TbH1.

Figure 8:
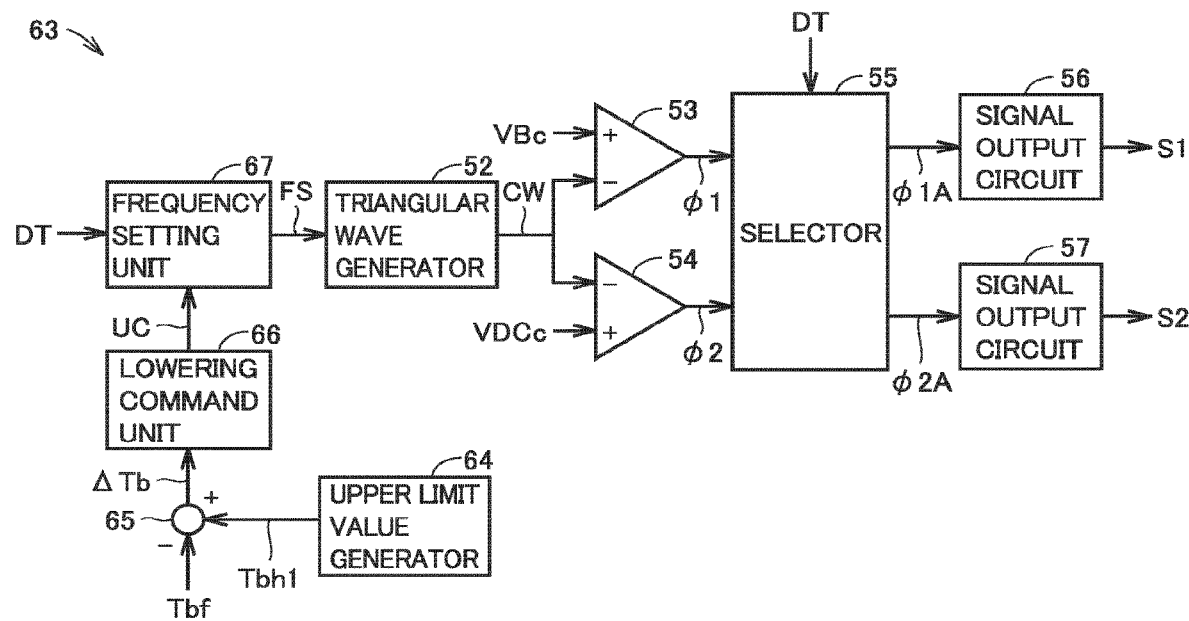
FIG. 8 is a block diagram showing a configuration of a PWM controller shown in FIG. 7.

FIG. 8 is a block diagram showing a configuration of PWM controller 63, in comparison with FIG. 4. Referring to FIG. 8, PWM controller 63 differs from PWM controller 42 in that an upper limit value generator 64, a subtractor 65, and a lowering command unit 66 are added and that frequency setting unit 51 is replaced by a frequency setting unit 67.

Upper limit value generator 64 outputs signal Tbh1 indicating upper limit value TbH1 of battery temperature Tb. Subtractor 65 outputs deviation ΔTb between signal Tbh1 and output signal Tbf of temperature detector 61. Lowering command unit 66 sets lowering command signal UC to "H" level when deviation ΔTb is a positive value, and sets lowering command signal UC to "L" level in response to deviation ΔTb reaching zero.

Frequency setting unit 67 applies signal FS having information indicating frequency f of triangular wave signal CW to triangular wave generator 52 to set frequency f of triangular wave signal CW, in response to output signal DT of polarity determiner 41 (FIG. 7) and lowering command signal UC from lowering command unit 66.

If signal DT is "H" level, frequency setting unit 67 sets frequency f of triangular wave signal CW to relatively high frequency fH, irrespective of lowering command signal UC. Triangular wave generator 52 generates triangular wave signal CW having the set frequency fH. IGBT Q1 of bidirectional chopper 5 (FIG. 6) is thus driven at relatively high frequency fH, and a temperature rise of battery 22 due to ripple current is suppressed.

If signal DT is "L" level, frequency setting unit 67 gradually lowers frequency f of triangular wave signal CW from relatively low frequency fL when lowering command signal UC is "H" level, and stops lowering frequency f of triangular wave signal CW in response to lowering command signal UC being set to "L" level.

At this time, triangular wave generator 52 generates triangular wave signal CW having the set frequency f. IGBT Q2 of bidirectional chopper 5 (FIG. 6) is driven at the set frequency f, ripple current flowing through battery 22 gradually increases, and battery temperature Tb gradually rises. When battery temperature Tb reaches upper limit value TbH1, the lowering of frequency f is stopped, and frequency f is set to lower limit frequency fmin1. IGBT Q2 is driven at lower limit frequency fmin1, and battery temperature Tb is kept at upper limit value TbH. The other configuration and operation is the same as the first embodiment and a description thereof is not repeated.

In the present second embodiment, frequency f of IGBT Q2 for discharging during a power failure of commercial AC power supply 21 is reduced to lower limit frequency fmin1 at which battery temperature Tb is upper limit value TbH1, so that the efficiency of the uninterruptible power supply apparatus can be increased compared with the first embodiment.

In the present second embodiment, frequency f of triangular wave signal CW is lowered from relatively low frequency fL. However, the present invention is not limited thereto, and frequency f of triangular wave signal CW may be lowered from relatively high frequency fH.

Third Embodiment

Figure 9:
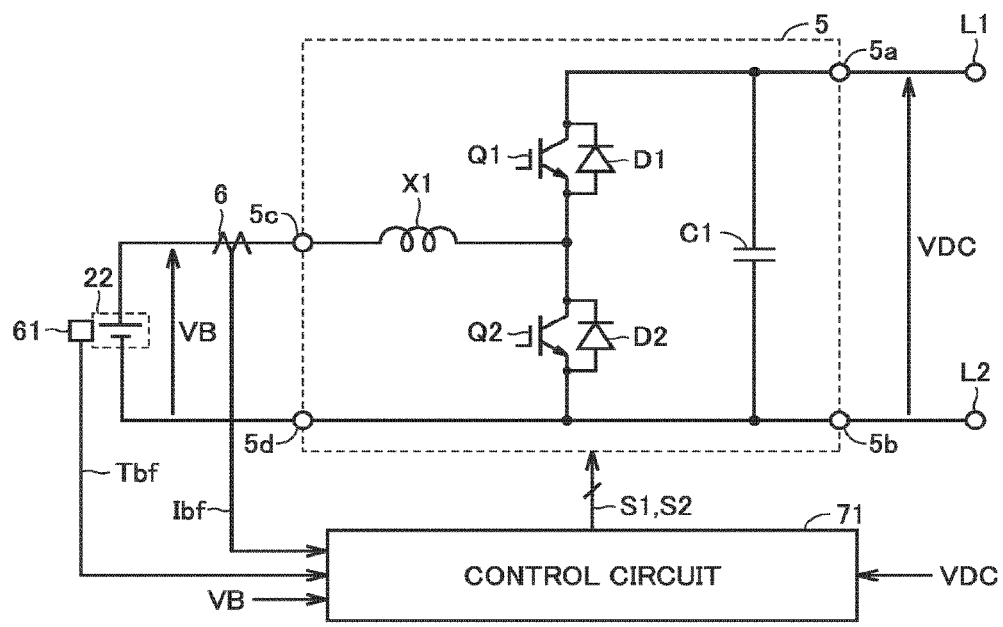
FIG. 9 is a circuit block diagram showing the main part of an uninterruptible power supply apparatus according to a third embodiment of the present invention.

FIG. 9 is a circuit block diagram showing the main part of an uninterruptible power supply apparatus according to a third embodiment of the present invention, in comparison with FIG. 6. Referring to FIG. 9, this uninterruptible power supply apparatus differs from the uninterruptible power supply apparatus in the second embodiment in that control circuit 62 is replaced by a control circuit 71.

Control circuit 71 differs from control circuit 62 in that frequency f for driving IGBT Q1 of bidirectional chopper 5 (FIG. 9) in a sound state of commercial AC power supply 21 is reduced from the above-noted relatively high frequency fH to lower limit frequency fmin2 at which temperature Tb of battery 22 reaches upper limit value TbH2. Upper limit value TbH2 (first upper limit value) is set to a value lower than the above-noted upper limit value TbH1 (second upper limit value).

That is, when frequency f for driving IGBT Q1 is reduced, switching loss in IGBT Q1 is reduced, and the efficiency of the uninterruptible power supply apparatus is increased. However, when frequency f is reduced, ripple current increases, temperature Tb of battery 22 rises, and the lifetime of battery 22 is reduced.

When the lifetime in a case where battery 22 is used at a reference temperature (for example 25° C.) is 100(%), the lifetime ratio (%) of battery 22 in a case where battery 22 is used at temperature Tb equal to or higher than reference temperature Tbs is reduced in accordance with the difference (Tb−Tbs) between battery temperature Tb and reference temperature Tbs.

In the present third embodiment, in a sound state of commercial AC power supply 21, frequency f for driving IGBT Q1 is reduced until battery temperature Tb reaches upper limit value TbH2 within a range in which the lifetime ratio (%) of battery 22 falls within a permissible range. Similarly to the second embodiment, in response to occurrence of a power failure of commercial AC power supply 21, frequency f for driving IGBT Q2 is reduced until battery temperature Tb reaches upper limit value TbH1 within a range in which the lifetime ratio (%) of battery 22 falls within a permissible range. Since the time for driving IGBT Q1 is longer than the time for driving IGBT Q2, TbH2<TbH1 is set in order to keep a long lifetime of battery 22.

Figure 10:
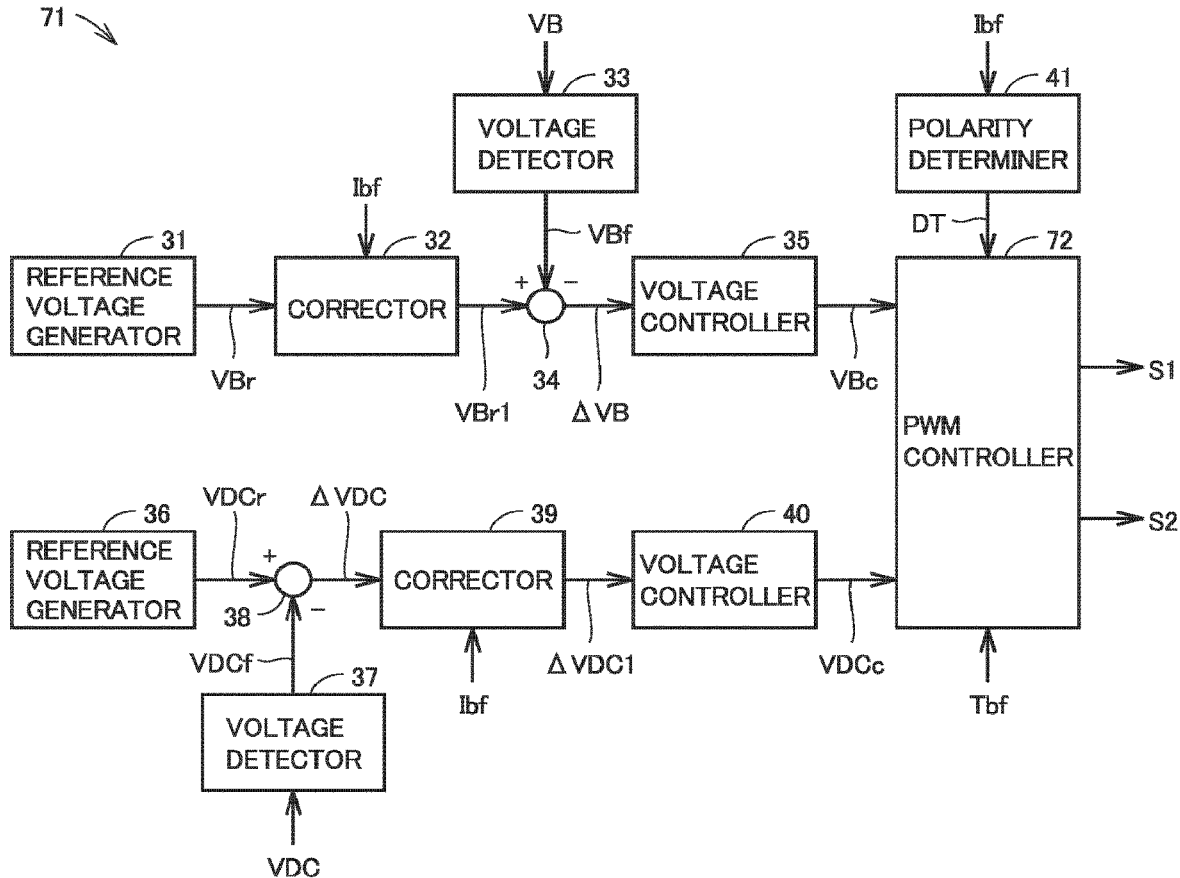
FIG. 10 is a block diagram showing a configuration of a control circuit shown in FIG. 9.

FIG. 10 is a block diagram showing a configuration of control circuit 71, in comparison with FIG. 7. Referring to FIG. 10, control circuit 71 differs from control circuit 62 in that PWM controller 63 is replaced by a PWM controller 72.

PWM controller 72 differs from PWM controller 63 in that in a sound state of commercial AC power supply 21, frequency f of triangular wave signal CW to be compared with voltage command value VBc is reduced from predetermined frequency fH to lower limit frequency fmin2 at which temperature Tb of battery 22 reaches upper limit value TbH2.

Figure 11:
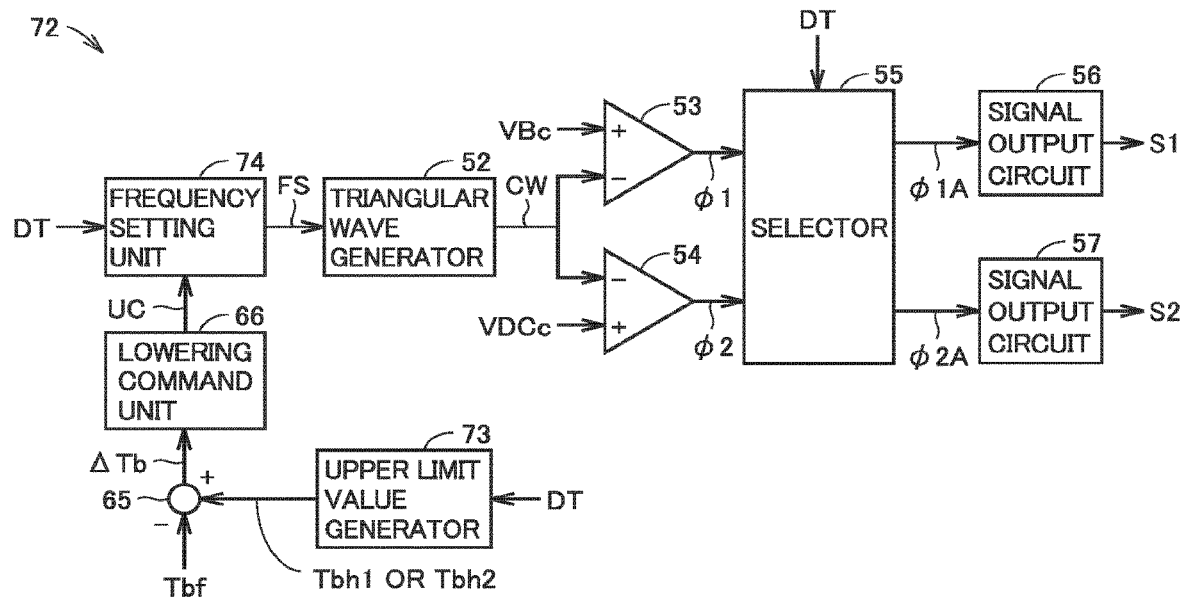
FIG. 11 is a block diagram showing a configuration of a PWM controller shown in FIG. 10.

FIG. 11 is a block diagram showing a configuration of PWM controller 72, in comparison with FIG. 8. Referring to FIG. 11, PWM controller 72 differs from PWM controller 63 in that upper limit value generator 64 and frequency setting unit 67 are replaced by an upper limit value generator 73 and a frequency setting unit 74, respectively.

Upper limit value generator 73 outputs signal Tbh2 indicating upper limit value TbH2 of battery temperature Tb when output signal DT of polarity determiner 41 (FIG. 10) is "H" level, and outputs signal Tbh1 indicating upper limit value TbH1 of battery temperature Tb when signal DT is "L" level. Subtractor 65 outputs deviation ΔTb between signal Tbh1 (or Tbh2) and output signal Tbf of temperature detector 61. Lowering command unit 66 sets lowering command signal UC to "H" level when deviation ΔTb is a positive value, and sets lowering command signal UC to "L" level in response to deviation ΔTb reaching zero.

Frequency setting unit 74 applies signal FS having information indicating frequency f of triangular wave signal CW to triangular wave generator 52 to set frequency f of triangular wave signal CW, in response to output signal DT of polarity determiner 41 (FIG. 7) and lowering command signal UC from lowering command unit 66.

If signal DT is "H" level, frequency setting unit 74 gradually lowers frequency f of triangular wave signal CW from relatively high frequency fH when lowering command signal UC is "H" level, and stops lowering frequency f of triangular wave signal CW in response to lowering command signal UC being set to "L" level.

At this time, triangular wave generator 52 generates triangular wave signal CW having the set frequency f. IGBT Q1 of bidirectional chopper 5 (FIG. 9) is driven at the set frequency f, ripple current flowing through battery 22 gradually increases, and battery temperature Tb gradually rises. When battery temperature Tb reaches upper limit value TbH2, the lowering of frequency f is stopped, and frequency f is set to lower limit frequency fmin2. IGBT Q1 is driven at lower limit frequency fmin2, and battery temperature Tb is kept at upper limit value TbH2.

If signal DT is "L" level, frequency setting unit 74 gradually lowers frequency f of triangular wave signal CW from relatively low frequency fL when lowering command signal UC is "H" level, and stops lowering frequency f of triangular wave signal CW in response to lowering command signal UC being set to "L" level.

At this time, triangular wave generator 52 generates triangular wave signal CW having the set frequency f. IGBT Q2 of bidirectional chopper 5 (FIG. 9) is driven at the set frequency f, ripple current flowing through battery 22 gradually increases, and battery temperature Tb gradually rises. When battery temperature Tb reaches upper limit value TbH1, the lowering of frequency f is stopped, and frequency f is set to lower limit frequency fmin1 IGBT Q2 is driven at lower limit frequency fmin1, and battery temperature Tb is kept at upper limit value TbH1. The other configuration and operation is the same as the first and second embodiments, and a description thereof is not repeated.

In the present third embodiment, since driving frequency f for IGBT Q1 for charging in a sound state of commercial AC power supply 21 is set to lower limit frequency fmin1 at which battery temperature Tb is upper limit value TbH2, the efficiency of the uninterruptible power supply apparatus can be increased compared with the second embodiment.

In the present third embodiment, frequency f of triangular wave signal CW is lowered from relatively low frequency fL in response to occurrence of a power failure of commercial AC power supply 21. However, the present invention is not limited thereto, and frequency f of triangular wave signal CW may be lowered from lower limit frequency fmin1.

Fourth Embodiment

Figure 12:
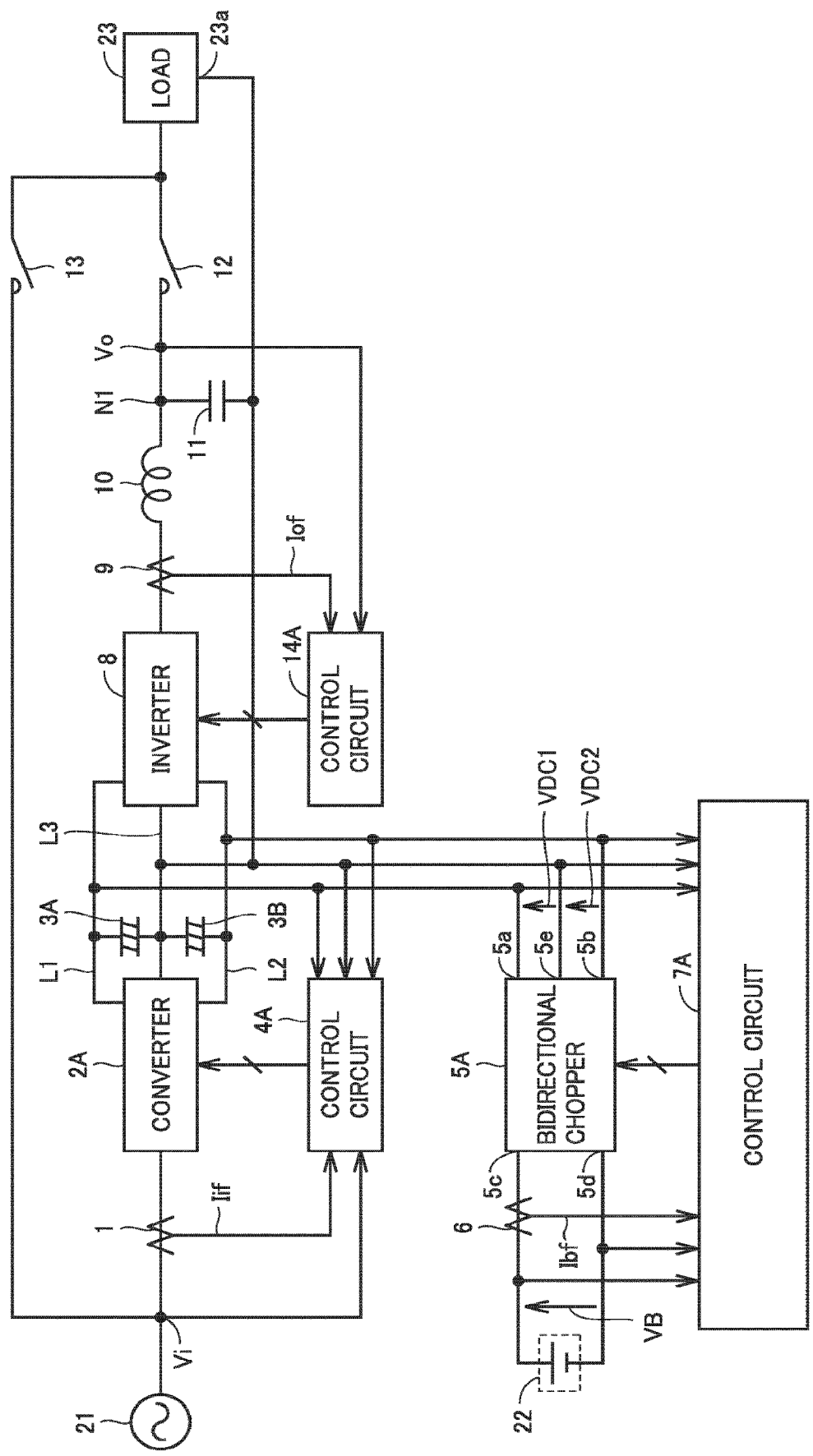
FIG. 12 is a circuit block diagram showing a configuration of an uninterruptible power supply apparatus according to a fourth embodiment of the present invention.

FIG. 12 is a circuit block diagram showing a configuration of an uninterruptible power supply apparatus according to a fourth embodiment of the present invention, in comparison with FIG. 1. Referring to FIG. 12, this uninterruptible power supply apparatus differs from the uninterruptible power supply apparatus in FIG. 1 in that converter 2, inverter 8, and bidirectional chopper 5 are replaced by a converter 2A, an inverter 8A, and a bidirectional chopper 5A, respectively, control circuits 4, 7, and 14 are replaced by control circuits 4A, 7A, and 14A, respectively, capacitor 3 is replaced by capacitors 3A and 3B, and a DC line L3 is added.

DC lines L1 to L3 are connected between converter 2A and inverter 8A and connected to bidirectional chopper 5A and control circuit 7A. DC line L3 is further connected to node N1 through capacitor 11 and connected to ground terminal 23a of load 23.

Capacitor 3A is connected between DC lines L1 and L3 to smooth DC voltage VDC1 between DC lines L1 and L3. Capacitor 3B is connected between DC lines L3 and L2 to smooth DC voltage VDC2 between DC lines L3 and L2.

Converter 2A is controlled by control circuit 4A and converts AC power from commercial AC power supply 21 to DC power to output the DC power to DC lines L1 to L3 in a sound state of commercial AC power supply 21. When a power failure of commercial AC power supply 21 occurs, the operation of converter 2A is stopped.

Converter 2A generates three level DC voltages Vdc1, Vdc2, and Vdc3 based on AC voltage from commercial AC power supply 21 and outputs DC voltages Vdc1 to Vdc3 to DC lines L1 to L3, respectively, in a sound state of commercial AC power supply 21. DC voltage Vdc1 is a positive voltage, DC voltage Vdc2 is a negative voltage, and DC voltage Vdc3 is ground voltage (0 V). VDC1=Vdc1−Vdc3, VDC2=Vdc3−Vdc2, and VDC1=VDC2. If Vdc1−Vdc2=VDC, VDC1+VDC2=VDC.

Control circuit 4A detects whether a power failure of commercial AC power supply 21 has occurred, based on the detected value of AC input voltage Vi. In a sound state of commercial AC power supply 21, control circuit 4A controls converter 2A such that DC voltage VDC attains a predetermined reference DC voltage VDCr (for example, 660 V), based on AC input voltage Vi, AC input current Ii, and DC voltage VDC. In a power failure of commercial AC power supply 21, control circuit 4A stops the operation of converter 2.

Bidirectional chopper 5A has high voltage-side nodes 5a, 5b, and 5e connected to DC lines L1 to L3, respectively, and low voltage-side nodes 5c and 5d connected to the positive electrode and the negative electrode of battery 22, respectively. Bidirectional chopper 5A is controlled by control circuit 7A, stores DC power generated by converter 2A into battery 22 in a sound state of commercial AC power supply 21, and supplies DC power of battery 22 to inverter 8A through DC lines L1 to L3 in response to occurrence of a power failure of commercial AC power supply 21.

The instantaneous value of DC voltage VDC between DC lines L1 and L2 is detected by control circuit 7A. Control circuit 7A adds the instantaneous value of DC voltage VDC1 between DC lines L1 and L3 to the instantaneous value of DC voltage VDC2 between DC lines L3 and L2 to obtain the instantaneous value of DC voltage VDC between DC lines L1 and L2.

Control circuit 7A controls bidirectional chopper 5A based on DC voltage VDC, DC current Ib, and terminal-to-terminal voltage VB of battery 22. Control circuit 7A determines whether a power failure of commercial AC power supply 21 has occurred, based on the polarity of DC current Ib.

Control circuit 7A controls bidirectional chopper 5A such that DC power generated by converter 2A is stored into battery 22 in a sound state of commercial AC power supply 21 and terminal-to-terminal voltage VB of battery 22 attains a predetermined reference DC voltage VBr (for example, 480 V).

Control circuit 7A also controls bidirectional chopper 5A such that DC power of battery 22 is supplied to inverter 8A in response to occurrence of a power failure of commercial AC power supply 21 and DC voltage VDC between DC lines L1 and L2 attains a predetermined reference DC voltage VDCr (for example, 660 V).

Inverter 8A is controlled by control circuit 14A and converts DC power supplied from converter 2A and bidirectional chopper 5A through DC lines L1 to L3 to AC power having a commercial frequency to output the converted AC power. That is, inverter 8A converts DC power supplied from converter 2A through DC lines L1 to L3 to AC power in a sound state of commercial AC power supply 21 and converts DC power supplied from battery 22 through bidirectional chopper 5A to AC power in response to occurrence of a power failure of commercial AC power supply 21. AC output voltage from inverter 8A is controllable to a desired value.

At this time, inverter 8A generates AC output voltage Vo based on DC voltages Vdc1 to Vdc3 on DC lines L1 to L3. Control circuit 14A controls inverter 8A such that AC output voltage Vo attains a predetermined reference AC voltage Vor based on AC output voltage Vo and AC output current Io.

Figure 13:
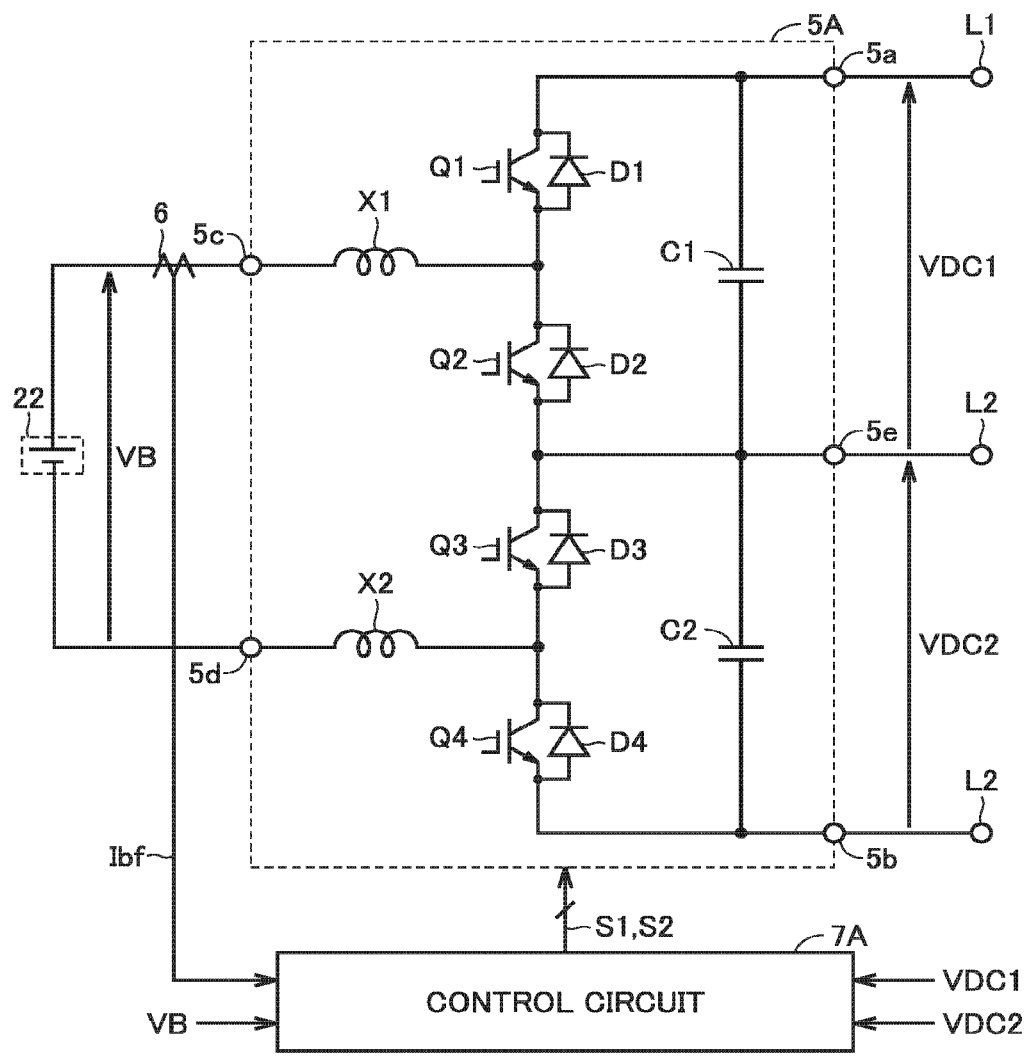
FIG. 13 is a circuit diagram showing a configuration of a bidirectional chopper shown in FIG. 12.

FIG. 13 is a circuit diagram showing a configuration of bidirectional chopper 5A, in comparison with FIG. 2. In FIG. 13, bidirectional chopper 5A includes IGBTs Q1 to Q4, diodes D1 to D4, reactors X1 and X2, and capacitors C1 and C2.

IGBT Q1 has the collector connected to high voltage-side node 5a and the emitter connected to low voltage-side node 5c through reactor X1 and connected to the collector of IGBT Q2. The emitter of IGBT Q2 is connected to high voltage-side node 5e and connected to the collector of IGBT Q3. The emitter of IGBT Q3 is connected to low voltage-side node 5d through reactor X2 and connected to the collector of IGBT Q4. The emitter of IGBT Q4 is connected to high voltage-side node 5b.

Diodes D1 to D4 are connected in anti-parallel with IGBTs Q1 to Q4, respectively. Capacitor C1 is connected between high voltage-side nodes 5a and 5e to stabilize DC voltage VDC1 between high voltage-side nodes 5a and 5e. Capacitor C2 is connected between high voltage-side nodes 5e and 5b to stabilize DC voltage VDC2 between high voltage-side nodes 5e and 5b.

IGBT Q1 (first switching element) and IGBT Q4 (fourth switching element) are turned on and off at relatively high constant frequency fH in a sound state of commercial AC power supply 21 and stores DC power generated by converter 2A into battery 22. In a sound state of commercial AC power supply 21, IGBTs Q2 and Q3 are fixed to the off state.

IGBTs Q1 and Q4 are controlled by gate signal S1 from control circuit 7A. Gate signal S1 is set to "H" level and "L" level at constant frequency fn. IGBTs Q1 and Q4 turn on when gate signal S1 is set to "H" level, and IGBTs Q1 and Q4 turn off when gate signal S1 is set to "L" level.

In a sound state of commercial AC power supply 21, when IGBTs Q1 and Q4 are turned on, if VDC>VB, current Ib flows through a path from DC line L1 to DC line L2 through IGBT Q1, reactor X1, battery 22, reactor X2, and IGBT Q4, so that battery 22 is charged and electromagnetic energy is stored in reactors X1 and X2.

When IGBTs Q1 and Q4 are turned off, current flows through a path from one terminal (the terminal on the battery 22 side) of reactor X1 to the other terminal of reactor X1 through battery 22, reactor X2, and diodes D3 and D2, so that battery 22 is charged and electromagnetic energy of reactors X1 and X2 is emitted.

The ratio between a period of time in which gate signal S1 is set to "H" level (pulse width) and one period (1/fH) is called duty ratio. Terminal-to-terminal voltage VB of battery 22 can be adjusted to a predetermined reference DC voltage VBr by adjusting the duty ratio of gate signal S1. DC voltage VDC=VDC1+VDC2 between DC lines L1 and L2 is lowered and applied to battery 22, and VB<VDC is attained.

IGBT Q2 (second switching element) and IGBT Q3 (third switching element) are turned on and off at relatively low constant frequency fL in response to occurrence of a power failure of commercial AC power supply 21 and supply DC power of battery 22 to inverter 8A, where fL<fH.

IGBTs Q2 and Q3 are controlled by gate signal S2 from control circuit 7A. Gate signal S2 is set to "H" level and "L" level at constant frequency fL. IGBTs Q2 and Q3 turn on when gate signal S2 is set to "H" level, and IGBTs Q2 and Q3 turn off when gate signal S2 is set to "L" level.

When supply of AC power from commercial AC power supply 21 is stopped and DC voltage VDC between DC lines L1 and L2 becomes lower than terminal-to-terminal voltage VB of battery 22, IGBTs Q1 and Q4 are fixed to the off state, and the turning on and off of IGBTs Q2 and Q3 is started.

When IGBTs Q2 and Q3 are turned on, current flows from the positive electrode of battery 22 to the negative electrode of battery 22 through reactor X1, IGBTs Q2 and Q3, and reactor X2, and electromagnetic energy is stored in reactors X1 and X2. When IGBTs Q2 and Q3 are turned off, current flowing from reactor X1 to IGBT Q2 is commutated from reactor X1 to diode D1 and flows to the negative electrode of battery 22 through capacitors C1 and C2, diode D4, and reactor X2, so that battery 22 is charged and electromagnetic energy of reactors X1 and X2 is emitted.

The ratio between a period of time in which gate signal S2 is set to "H" level (pulse width) and one period (1/fH) is called duty ratio. DC voltage VDC=VDC1+VDC2 between DC lines L1 and L2 can be adjusted to a predetermined reference DC voltage VDCr by adjusting the duty ratio of gate signal S2. Terminal-to-terminal voltage VB of battery 22 is raised and applied between DC lines L1 and L2, and VB<VDC is attained.

Control circuit 7A detects whether a power failure of commercial AC power supply 21 has occurred, based on output signal Ibf of current detector 6. When a power failure of commercial AC power supply 21 occurs, the operation of converter 2 is stopped, DC power is supplied from capacitors 3A, 3B, C1, and C2 to inverter 8A, and DC voltage VDC between DC lines L1 and L2 lowers. When VDC=VB, current does not flow through IGBTs Q1 and Q4 even by turning on and off IGBTs Q1 and Q4. When VDC<VB, current Ib flows from the positive electrode of battery 22 to the negative electrode of battery 22 through reactor X1, diode D1, capacitors C1 and C2, diode D4, and reactor X2.

Thus, when a power failure of commercial AC power supply 21 occurs, the polarity of current Ib flowing from low voltage-side node 5c of bidirectional chopper 5A to the positive electrode of battery 22 is reversed from positive to negative. When the polarity of current Ib is reversed from positive to negative, control circuit 7 detects that a power failure of commercial AC power supply 21 has occurred. Current detector 6 may be provided inside bidirectional chopper 5A. For example, current detector 6 may detect current Ib flowing between the emitter of IGBT Q1 and reactor X1.

When commercial AC power supply 21 is in a sound state and the operation of the uninterruptible power supply apparatus is started, control circuit 7A sets gate signal S1 to "H" level and "L" level at relatively high constant frequency fH and fixes gate signal S2 to "L" level. Since frequency fH is set to a relatively high frequency, ripple current flowing through battery 22 is suppressed. Accordingly, the temperature rise of battery 22 due to ripple current is suppressed, and the reduction in lifetime of battery 22 due to ripple current can be prevented.

When occurrence of a power failure of commercial AC power supply 21 is detected, control circuit 7A sets gate signal S2 to "H" level and "L" level at relatively low constant frequency fL and fixes gate signal S1 to "L" level. Since frequency fL is set to a relatively low frequency, switching loss in IGBTs Q2 and Q3 is suppressed. Thus, the efficiency of the uninterruptible power supply apparatus is increased, and the operating time of load 23 during a power failure can be increased.

In this case, ripple current flows through battery 22 and the temperature of battery 22 rises. However, the time for driving IGBTs Q2 and Q3 is shorter than the time for driving IGBTs Q1 and Q4 and therefore the reduction in lifetime of battery 22 can be suppressed.

The other configuration and operation is the same as the first embodiment, and a description thereof is not repeated. The present fourth embodiment achieves the same effect as the first embodiment.

The embodiments disclosed here should be understood as being illustrative rather than being limitative in all respects. The present invention is shown not in the foregoing description but in the claims, and it is intended that all modifications that come within the meaning and range of equivalence to the claims are embraced here.

REFERENCE SIGNS LIST 1, 6, 9 current detector, 2, 2A converter, L1 to L3 DC line, 3, 3A, 3B, 11, C1, C2 capacitor, 4, 4A, 7, 7A, 14, 14A, 62, 71 control circuit, 5, 5A bidirectional chopper, 8, 8A inverter, 10, X1, X2 reactor, 12, 13 electromagnetic contact, Q1 to Q4 IGBT, D1 to D4 diode, 21 commercial AC power supply, 22 battery, 23 load, 31, 36 reference voltage generator, 32, 39 corrector, 33, 37 voltage detector, 34, 38, 65 subtractor, 35, 40 voltage controller, 41 polarity determiner, 42, 63, 72 PWM controller, 51, 67, 74 frequency setting unit, 52 triangular wave generator, 53, 54 comparator, 55 selector, 56, 57 signal output circuit, 61 temperature detector, 64, 73 upper limit value generator, 66 lowering command unit.

The invention claimed is:

1. An uninterruptible power supply apparatus comprising:
   a forward converter that converts AC power supplied from a commercial AC power supply to DC power and supply the DC power to a DC load;
   a bidirectional chopper including a first switching element for storing DC power generated by the forward converter into a power storage device and a second switching element for supplying DC power of the power storage device to the DC load;
   a control circuit that drives the first switching element at a first frequency in a sound state of the commercial AC power supply, and drives the second switching element at a second frequency lower than the first frequency in response to occurrence of a power failure of the commercial AC power supply; and
   first and second DC lines connected between the forward converter and the DC load, wherein
      the bidirectional chopper is connected between the first and second DC lines and the power storage device, and
      the control circuit includes
         a first voltage command circuit that generates a first voltage command value for setting a terminal-to-terminal voltage of the power storage device to a first reference DC voltage,
         a second voltage command circuit that generates a second voltage command value for setting DC voltage between the first and second DC lines to a second reference DC voltage higher than the first reference DC voltage,
      a frequency setting circuit that sets a frequency of a triangular wave signal to the first frequency in a sound state of the commercial AC power supply and sets a frequency of the triangular wave signal to the second frequency in response to occurrence of a power failure of the commercial AC power supply,
         a triangular wave generator circuit that generates the triangular wave signal having a frequency set by the frequency setting circuit, and
         a signal generator circuit that generates a first control signal for controlling the first switching element based on a result of comparison between the first voltage command value and the triangular wave signal in a sound state of the commercial AC power supply, and generates a second control signal for controlling the second switching element based on a result of comparison between the second voltage command value and the triangular wave signal in response to occurrence of a power failure of the commercial AC power supply.

2. The uninterruptible power supply apparatus according to claim 1, wherein
   the frequency setting circuit
   sets a frequency of the triangular wave signal to the first frequency predetermined, in a sound state of the commercial AC power supply, and
   sets a frequency of the triangular wave signal to the second frequency predetermined, in response to occurrence of a power failure of the commercial AC power supply.

3. The uninterruptible power supply apparatus according to claim 1, further comprising a temperature detector that detects temperature of the power storage device, wherein
   the frequency setting circuit
   sets a frequency of the triangular wave signal to the first frequency predetermined, in a sound state of the commercial AC power supply, and
   lowers a frequency of the triangular wave signal from an upper limit frequency equal to or lower than the first frequency in response to occurrence of a power failure of the commercial AC power supply, and stops lowering a frequency of the triangular wave signal to set a frequency of the triangular wave signal to the second frequency, in response to temperature of the power storage device reaching a predetermined upper limit value.

4. The uninterruptible power supply apparatus according to claim 1, further comprising a temperature detector that detects temperature of the power storage device, wherein
   the frequency setting circuit
   lowers a frequency of the triangular wave signal from a predetermined first upper limit frequency in a sound state of the commercial AC power supply, and stops lowering a frequency of the triangular wave signal to set a frequency of the triangular wave signal to the first frequency in response to temperature of the power storage device reaching a predetermined first upper limit value, and
   lowers a frequency of the triangular wave signal from a second upper limit frequency equal to or lower than the first frequency in response to occurrence of a power failure of the commercial AC power supply, and stops lowering a frequency of the triangular wave signal to set a frequency of the triangular wave signal to the second frequency in response to temperature of the power storage device reaching a second upper limit value higher than the predetermined first upper limit value.

5. The uninterruptible power supply apparatus according to claim 1, further comprising a current detector that detects DC current flowing between the bidirectional chopper and the power storage device,
   wherein the control circuit determines that a power failure of the commercial AC power supply has occurred, in response to polarity of DC current detected by the current detector being reversed.

6. The uninterruptible power supply apparatus according to claim 1, further comprising first and second DC lines connected between the forward converter and the DC load, wherein
   the forward converter converts AC voltage supplied from the commercial AC power supply to DC voltage and outputs the DC voltage between the first and second DC lines,
   the bidirectional chopper further includes first and second diodes and a reactor,
   a first electrode of the first switching element is connected to the first DC line,
   a second electrode of the first switching element is connected to a positive electrode of the power storage device through the reactor and connected to a first electrode of the second switching element,
   a second electrode of the second switching element is connected to a negative electrode of the power storage device and connected to the second DC line, and
   the first and second diodes are connected in anti-parallel with the first and second switching elements, respectively.

7. The uninterruptible power supply apparatus according to claim 1, further comprising first to third DC lines connected between the forward converter and the DC load, wherein the forward converter converts AC voltage supplied from the commercial AC power supply to first to third DC voltages and outputs the first to third DC voltages to the first to third DC lines, respectively, the bidirectional chopper further includes third and fourth switching elements, first to fourth diodes, and first and second reactors, a first electrode of the first switching element is connected to the first DC line, a second electrode of the first switching element is connected to a positive electrode of the power storage device through the first reactor and connected to a first electrode of the second switching element, a second electrode of the second switching element is connected to the third DC line and connected to a first electrode of the third switching element, a second electrode of the third switching element is connected to a negative electrode of the power storage device through the second reactor and connected to a first electrode of the fourth switching element, a second electrode of the fourth switching element is connected to the second DC line, the first to fourth diodes are connected in anti-parallel with the first to fourth switching elements, respectively, and the control circuit drives the first and fourth switching elements at the first frequency in a sound state of the commercial AC power supply, and drives the second and third switching elements at the second frequency in response to occurrence of a power failure of the commercial AC power supply.

8. The uninterruptible power supply apparatus according to claim 1, wherein the DC load includes a reverse converter that converts DC power supplied from the forward converter and the bidirectional chopper to AC power and supplies the AC power to an AC load.

* * * * *